(12) United States Patent
Ibayashi et al.

(10) Patent No.: US 8,371,189 B2
(45) Date of Patent: Feb. 12, 2013

(54) UMBILICAL MEMBER ARRANGEMENT UNIT OF ROBOT WRIST SECTION

(75) Inventors: Jun Ibayashi, Yamanashi (JP); Munehiro Jinushi, Yamanashi (JP); Hirokazu Kume, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 73 days.

(21) Appl. No.: 13/033,047

(22) Filed: Feb. 23, 2011

(65) Prior Publication Data

US 2011/0252914 A1 Oct. 20, 2011

(30) Foreign Application Priority Data

Apr. 16, 2010 (JP) ................................. 2010-094875

(51) Int. Cl.
*B25J 17/00* (2006.01)
*B25J 17/02* (2006.01)
(52) U.S. Cl. ...................... 74/490.02; 901/29
(58) Field of Classification Search ............... 74/490.02, 74/490.06; 901/28, 29
See application file for complete search history.

(56) References Cited

U.S. PATENT DOCUMENTS

| 7,202,442 | B2 * | 4/2007 | Nakagiri et al. | 219/137.9 |
| 8,109,170 | B2 * | 2/2012 | Jinushi et al. | 74/490.01 |
| 2006/0258229 | A1 | 11/2006 | Harada et al. | |
| 2008/0258402 | A1 * | 10/2008 | Tamura et al. | 277/345 |
| 2011/0252913 | A1 * | 10/2011 | Ibayashi et al. | 74/490.02 |

FOREIGN PATENT DOCUMENTS

| DE | 112005001432 T5 | 5/2007 |
| JP | 10-034587 A | 2/1998 |
| JP | 2003-136462 A | 5/2003 |
| JP | 2004-050369 A | 2/2004 |
| JP | 2005-288560 A | 10/2005 |
| JP | 2006-159305 A | 6/2006 |
| JP | 2010-042479 A | 2/2010 |

OTHER PUBLICATIONS

Office Action issued by the German Patent Office on Sep. 12, 2012, in corresponding German Application No. 10 2011 014 150.2, with English translation.

* cited by examiner

*Primary Examiner* — William C Joyce
*Assistant Examiner* — Terence Boes
(74) *Attorney, Agent, or Firm* — Lowe Hauptman Ham & Berner, LLP

(57) ABSTRACT

An umbilical member arrangement unit for an umbilical member, having a simple structure and high rigidity, capable of avoiding interference between the umbilical member and external equipment. The unit has a guide member constituted by a first plate member attached to a front end of a wrist section, a second plate member opposed to the first plate member and a connecting member connecting the first and second plate members. A cross-sectional region of the connecting member includes the wrist axis, extends from the axis in a first radial direction by a distance not smaller than a half of a size of the umbilical member in the cross-sectional direction thereof, and extends from the axis in an axisymmetrical second radial direction by a distance not larger than a half of the size of the umbilical member, so that the umbilical member contacts the second plate member and/or the connecting member at any rotational angular position of the guide member.

4 Claims, 3 Drawing Sheets

A-A SECTION

B-B SECTION

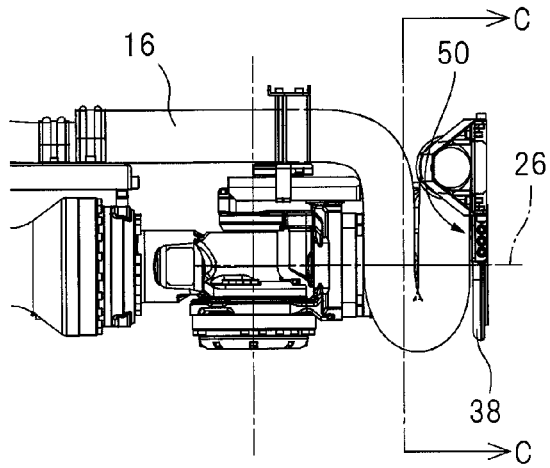
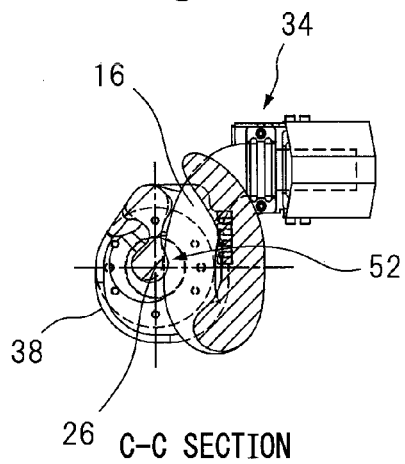
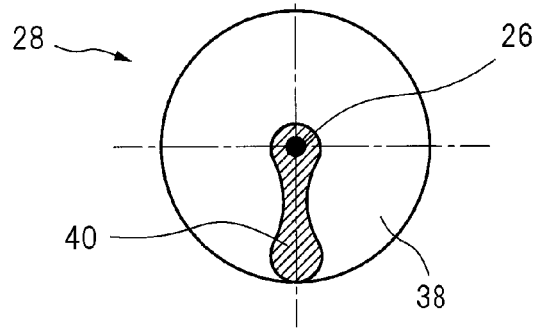
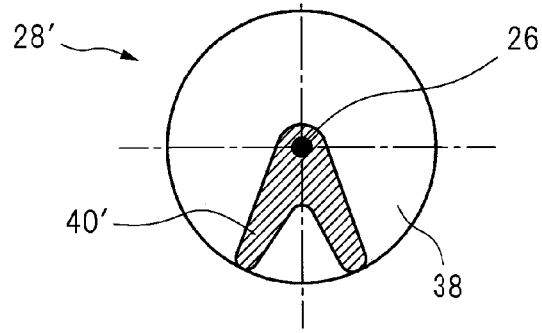

UMBILICAL MEMBER ARRANGEMENT UNIT OF ROBOT WRIST SECTION

RELATED APPLICATIONS

The present application claims priority from Japanese Patent Application No. 2010-94875, filed on Apr. 16, 2010, the entire contents of which are fully incorporated herein by reference.

BACKGROUND OF THE INVENTION

1. Field of the Invention

The preset invention relates to an arrangement unit for an umbilical member arranged at a robot wrist section of an industrial robot.

2. Description of the Related Art

When an industrial robot is used, the robot is required to be provided with an umbilical member including a cable for transmitting power or a signal and/or a tube for transmitting coolant or activation gas to an end effector, such as a hand or a welding gun, attached to the end of a wrist section of the robot, via a forearm of the robot. It is necessary that the umbilical member, arranged around the wrist section of the robot, has a certain amount of extra length (margin) so that excess force is not applied to the umbilical member over the entire operation range of the wrist section. On the other hand, the extra length of the umbilical member may be slack depending on the position and/or the orientation of the wrist section of the robot, and the umbilical is required to not interfere with external equipment, such as a neighboring robot, a hand, a jig, workpiece, etc.

For example, Japanese Unexamined Patent Publication No. 2003-136462 discloses an intermediate member for avoiding interference with a cable or the like and external equipment. Concretely, it is described that intermediate member 6 is disposed between a wrist flange 4 and a spot welding gun 5, and has connecting members 6c and 6d parallel to each other. In this regard, a welding cable 7 extends below intermediate member 6 and is fixed to spot welding gun 5 via the center of a third wrist axis 23 and a region between connecting members 6c and 6d.

Further, Japanese Unexamined Patent Publication No. 2005-288560 discloses an intermediate member or a connecting member for avoiding interference between a tube/wire member and external equipment. Concretely, it is described that C-shaped connecting member 7 has a connecting wall 71 arranged at one circumferential side and guide members 73, 73 arranged at an opening 72 at a side opposed to connecting wall 71.

In the configuration of Japanese Unexamined Patent Publication No. 2003-136462, when the umbilical member is replaced with another, removing and attaching of the umbilical member relative to the intermediate member must be carried out, which is troublesome for an operator and maintenance performance may be decreased. On the other hand, in the configuration of Japanese Unexamined Patent Publication No. 2005-288560, the umbilical member may protrude from the opening and interfere with external equipment. Further, since the rigidity of the connecting member at the opening is relatively low, the end effector easily vibrates during operation of the robot. One way to avoid the vibration of the end effector is to limit the operation speed of the robot. However, a cycle time of the operation is increased in this case.

SUMMARY OF THE INVENTION

Therefore, an object of the present invention is to provide an umbilical member arrangement unit having a simple structure and high rigidity, capable of effectively avoiding interference between the umbilical member and external equipment.

According to the present invention, there is provided an arrangement unit for an umbilical member at a robot wrist section, the umbilical member extending to an end effector attached to a front end of the wrist section via a forearm of an industrial robot, the umbilical member being constituted by at least one of a cable adapted to supply power or a signal to the end effector and a tube adapted to supply coolant or activation air to the end effector, the arrangement unit comprising a guide member constituted by: a first plate member rotatably attached to a front end of the wrist section about a wrist axis; a second plate member, to which the end effector is fixed, the second plate member being opposed to the first plate member and separated from the first plate member by at least a distance corresponding to a size of the umbilical member in a cross-sectional direction thereof; and a connecting member which connects the first and second plate members to each other, wherein a cross-sectional region of the connecting member in a direction perpendicular to the wrist axis includes the wrist axis, extends from the wrist axis in a first radial direction by a distance equal to or larger than a half of a size of the umbilical member in the cross-sectional direction perpendicular to the longitudinal direction thereof, and extends from the wrist axis in a second radial direction by a distance equal to or smaller than a half of the size of the umbilical member in the cross-sectional direction perpendicular to the longitudinal direction thereof, the first and second radial directions being symmetrical with respect to the wrist axis, and wherein the umbilical member contacts at least one of the second plate member and the connecting member at any rotational angular position in a predetermined rotational angular range of the guide member relative to the front end of the wrist section.

In a preferred embodiment, the umbilical member is constituted by combining and integrally twisting a plurality of cables or tubes so as to form a bundle.

In a preferred embodiment, the twisting direction or an amount of the twisting of the plurality of cables or tubes per unit of length is determined so that the umbilical member does not outwardly projects in a twisting radial direction of thereof.

In a preferred embodiment, the umbilical member has at least one of a cover adapted to enclose the umbilical member and a coil spring through which the umbilical member extends.

BRIEF DESCRIPTION OF THE DRAWINGS

The above and other objects, features and advantages of the present invention will be made more apparent by the following description of the preferred embodiments thereof, with reference to the accompanying drawings, wherein:

FIG. 1b is a cross-sectional view along A-A line of FIG. 1a;

FIG. 2a is a top view showing the state wherein a guide member rotates from the state of FIG. 1a;

FIG. 2b is a cross-sectional view along B-B line of FIG. 2a;

FIG. 3a is a top view showing the state wherein the guide member rotates from the state of FIG. 1a in the opposite direction of the direction of FIG. 2a;

FIG. 3b is a cross-sectional view along C-C line of FIG. 3a;

FIG. 4 shows an example wherein a connecting member is formed as a generally I-shape;

FIG. 5 shows an example wherein the connecting member is formed as a generally V-shape;

DETAILED DESCRIPTIONS

Figure 1B:
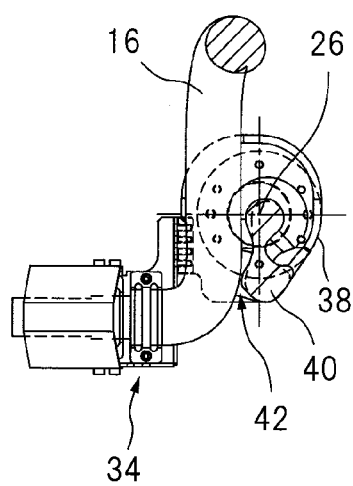
Figure 1A:
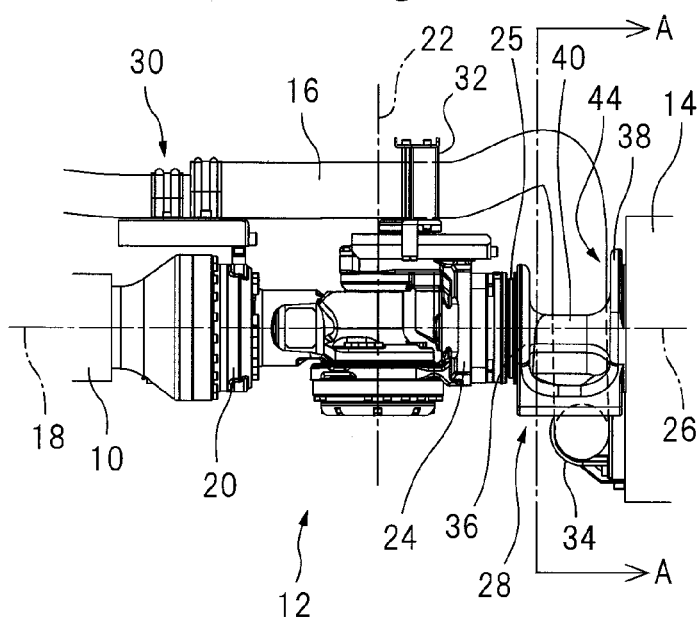
FIG. 1a is a top view around a robot wrist section including an arrangement unit for an umbilical member according to an embodiment of the invention.

FIGS. 1a and 1b show a preferred embodiment of the invention; concretely, a top view (FIG. 1a) of an arrangement unit for an umbilical member 16 extending to a schematically indicated end effector 14 attached to a front end of a wrist section 12 via a forearm 10 of an industrial robot, a cross-sectional view (FIG. 1b) along A-A line of FIG. 1a. Wrist section 12 has a first rotating part 20 attached to a front end of forearm 10 and configured to rotate about a first wrist axis 18 generally corresponding to the longitudinal direction of forearm 10, a second rotating part 24 attached to first rotating part 20 and configured to rotate about a second wrist axis 22 generally perpendicular to first wrist axis 18, a third rotating part 25 attached to second rotating part 24 and configured to rotate about a third wrist axis 26 generally perpendicular to second wrist axis 22, and a guide member 28 fixed to third rotating part 25 to which end effector 14 is attached. The detail of guide member 28 is described below. In the invention first and rotating parts 20 and 24 are not essential. Therefore, at least one of the first and second rotating parts may be omitted.

Umbilical member 16 is a flexible member including at least one of a cable for supplying power or a signal to end effector 14 and a tube for supplying coolant or activation air to end effector 14. It is preferable that the umbilical member is not completely flexible and has a certain degree of rigidity or elasticity, as described below. Umbilical member 16 extends, from a supply source (not shown) of power, signals, coolant or activation air, along forearm 10, and is fixed (preferably, non-slidably) to a first fixing member 30 configured to rotate integrally with first rotating part 20. Umbilical member 16 is then held or guided (preferably, non-slidably) by a holding member 32 attached to second rotating part 24, contacts guide member 28, and fixed to a second fixing member 34 arranged on end effector 14 or guide member 28. The contact configuration between umbilical member 16 and guide member 28 is described below.

As shown in FIG. 1a, guide member 28 has a first plate member 36 fixed to third rotating part 25, a second plate member 38 fixed to end effector 14, and a connecting member 40 which connects the first and second plate members face to face. First plate member 36 and second plate member 38 are separated from each other by a distance corresponding to the size of umbilical member 16 of the cross-section in the direction perpendicular to the longitudinal direction thereof (for example, a diameter), and preferably, are parallel to and opposed to each other. As shown in FIG. 1b, a cross-sectional region of connecting member 40 in a direction perpendicular to third wrist axis 26 includes third wrist axis 26, extends from third wrist axis 26 in a first radial direction (a downward direction in FIG. 1b) by a distance equal to or larger than a half of a size (for example, a diameter) of umbilical member 16 in the cross-sectional direction perpendicular to the longitudinal direction thereof, and extends from third wrist axis 26 in a second radial direction (an upward direction in FIG. 1b) by a distance equal to or smaller than a half of the size of umbilical member 16 in the cross-sectional direction perpendicular to the longitudinal direction thereof, the first and second radial directions being symmetrical with respect to third wrist axis 26.

FIGS. 1a and 1b show the arrangement of umbilical member 16 when a rotational angular position of guide member 28 (or third rotating part 25) relative to second rotating part 24 corresponds to the center of a rotational motion range thereof about third wrist axis 26. In detail, guide member 28 may rotate either clockwise and counterclockwise by a predetermined angle (preferably, more than 180 degrees) from the center position as shown in FIGS. 1a and 1b. As shown in FIG. 1b, when guide member 28 is positioned at the center of the rotational motion range thereof, the extending direction of umbilical member 16 and the extending direction of connecting member 40 in a cross-section perpendicular to third wrist axis 26 are generally the same. Further, when guide member 28 is positioned at the center of the rotational motion range thereof, umbilical member 16 contacts connecting member 40 at a site 42 with a predetermined pressing force, and contacts second plate member 38 at a site 44 with a predetermined pressing force, as shown in FIG. 1a. As such, due to the contact between umbilical member 16 and connecting member 40 and/or second plate member 38, with the predetermined pressing force, desired frictional force occurs at the contact site between them, whereby umbilical member 16 may be rotated along with guide member 28 by the frictional force when guide member 28 rotates as described below.

Figure 2B:
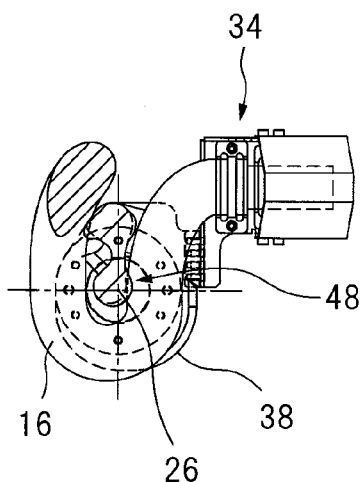
Figure 2A:
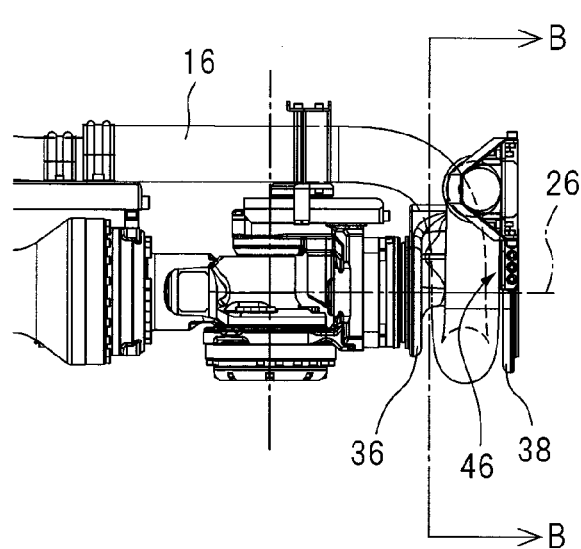

Next, FIGS. 2a and 2b show the arrangement of umbilical member 16 when guide member 28 rotates so that umbilical member 16 twists around connecting member 40 (or in the counterclockwise direction in FIG. 1b) by 180 degrees from the center position as shown in FIGS. 1a and 1b. In this regard, umbilical member 16 contacts second plate member 38 at a site 46 with a predetermined pressing force as shown in FIG. 2a, and contacts connecting member 40 at a site 48 with a predetermined pressing force as shown in FIG. 2b. Due to this, desired frictional force occurs between umbilical member 16 and second plate member 38, and between umbilical member 16 and connecting member 40. Accordingly, umbilical member 16 does not significantly slide relative to connecting member 40 and second plate member 38 when guide member 28 rotates, whereby umbilical member 16 does not widely project from guide member 28 in the radial direction of third wrist axis 26.

On the other hand, FIGS. 3a and 3b show the arrangement of umbilical member 16 when guide member 28 rotates in the direction opposite to the direction of FIGS. 2a and 2b (or in the clockwise direction in FIG. 1b) by 180 degrees from the center position as shown in FIGS. 1a and 1b. In this regard, umbilical member 16 contacts second plate member 38 at a site 50 with a predetermined pressing force as shown in FIG. 3a, and contacts connecting member 40 at a site 52 with a predetermined pressing force as shown in FIG. 2b. Due to this, desired frictional force occurs between umbilical member 16 and second plate member 38, and between umbilical member 16 and connecting member 40. Accordingly, umbilical member 16 does not significantly slide relative to connecting member 40 and second plate member 38 when guide member 28 rotates, whereby umbilical member 16 does not widely project from guide member 28 in the radial direction of third wrist axis 26.

As shown in FIGS. 1a to 3b, at any rotational angular position of guide member 28 within a predetermined rotational angular range thereof (in the embodiment, ±180 degrees), umbilical member 16 contacts at least one of connecting member 40 and second plate member 38, and then the frictional force occurs at the contact site. Therefore, when guide member 28 rotates, umbilical member 16 may be rotated along with guide member 28, mainly due to the frictional force, whereby umbilical member 16 does not widely project from guide member 28 in the radial direction in relation to third wrist axis 26, and thus interference between the umbilical member and external equipment may be effectively avoided. Further, as shown in FIG. 1b etc., a cross-sectional region of connecting member 40 in a direction perpendicular to third wrist axis 26 includes third wrist axis 26, and extends from third wrist axis 26 in a first radial direction by a distance equal to or larger than a half of a size (or a diameter) of umbilical member 16 in the cross-sectional direction perpendicular to the longitudinal direction thereof. Due to this, guide member 28 is rigid so that the positioning accuracy of the end effector may be improved even when third wrist axis 26 rotates at high speed. On the other hand, the cross-sectional region of connecting member 40 in the direction perpendicular to third wrist axis 26 extends from third wrist axis 26 in a second radial direction by a distance equal to or smaller than a half of the size of the umbilical member in the cross-sectional direction perpendicular to the longitudinal direction thereof, the first and second radial directions being symmetrical with respect to the wrist axis. Due to this, a space for guiding umbilical member 16 is formed between first plate member 36 and second plate member 38, whereby umbilical member 16 does not widely project from guide member 28.

The extending distance of connecting member 40 in the first radial direction is determined in view of the rigidity which guide member 28 should have. Therefore, the extending distance of connecting member 40 in the first radial direction is not limited to the distance equal to or larger than a half of the size of umbilical member 16 in the cross-sectional direction, for example, may be equal to or larger than one third or two thirds of the size of umbilical member 16 in the cross-sectional direction, depending on a material of the guide member, etc. On the other hand, the extending distance of connecting member 40 in the second radial direction is determined in view of the arrangement space for the umbilical member between first plate member 36 and second plate member 38. Therefore, the extending distance of connecting member 40 in the second radial direction is not limited to the distance equal to or smaller than a half of the size of umbilical member 16 in the cross-sectional direction, for example, may be equal to or smaller than one third or two thirds of the size of umbilical member 16 in the cross-sectional direction, depending on the size of the plate member, etc.

In the embodiment, by adjusting the position and/or orientation of at least one of first fixing member 30, holding member 32 and second fixing member 34, at any rotational angular position as shown in FIGS. 1a to 3b, umbilical member 16 may be pressed against connecting member 40 and second plate member 38 so that frictional force, sufficient to prevent umbilical member 16 from significantly slide relative to at least one of connecting member 40 and second plate member 38, is generated.

In the embodiment, holding member 32 and second fixing member 34, which hold or fix umbilical member 16 at anterior and posterior positions relative to guide member 28, are positioned opposed to each other in relation to third wrist axis 26 in the extending direction of connecting member 40 in the stated of FIGS. 1a and 1b (i.e., when the rotational angular position of guide member 28 is positioned at the center of the motion range thereof). Due to this, umbilical member 16 extending near guide member 28 may contact connecting member 40 and second plate member 38.

FIG. 4 schematically shows guide member 28 as shown in FIG. 1b. Preferably, second plate member 38 is generally a circular shaped plate member. It is preferable that the size or the distance from the rotational center (third wrist axis 26) of second plate member 38 (i.e., a radius of the second plate member in FIG. 4) is as small as possible in order to avoid interference between the second plate member and external equipment. However, in view of the arrangement of umbilical member 16 winding around the guide member as shown in FIG. 2b, it is preferable that the above size of second plate member 38 is generally equal to the size of the cross-section (or the diameter) of umbilical member 16. On the other hand, it is preferable that the size (or the radius in FIG. 4) of second plate member 38 is equal to or larger than a half of the size of the cross-section (or the diameter) of umbilical member 16, in order to generate proper frictional force between the second plate member and umbilical member 16.

Although the cross-section of connecting member 40 is illustrated as a simple I-shape in FIG. 4, the cross-section may be modified in view of the rigidity which the guide member should have. Connecting member 40 may be designed with a high degree of freedom, for example, as shown in FIG. 1b, a portion of the connecting member which affects the rigidity thereof may be formed as a thick wall and another portion of the connecting member which has an insignificant effect on the rigidity thereof may be formed as a thin wall. As such, due to the invention, the arrangement unit for the umbilical member, having a simple structure and high rigidity and capable of effectively preventing the umbilical member from widely projecting, may be obtained.

FIG. 5 shows a guide member 28' obtained by modifying guide member 28 of FIG. 4. In guide member 28', connecting member 40' has a plurality of portions, each extending by a distance larger than a half of the diameter of the umbilical member. For example, connecting member 40' generally has a V-shape. Due to this, the rigidity of guide member 28 may be higher than the I-shaped member as shown in FIG. 4. On the other hand, the weight of the guide member may be reduced when the connecting member is the I-shaped member. In addition, when the connecting member has a plurality of portions each extending longer than a half of the diameter of the umbilical member, as shown in FIG. 5, all of the portions are configured to lie on one of two semicircles, which schematically indicate second plate member 28', more preferably on one quadrant of the circle.

Figure 6:
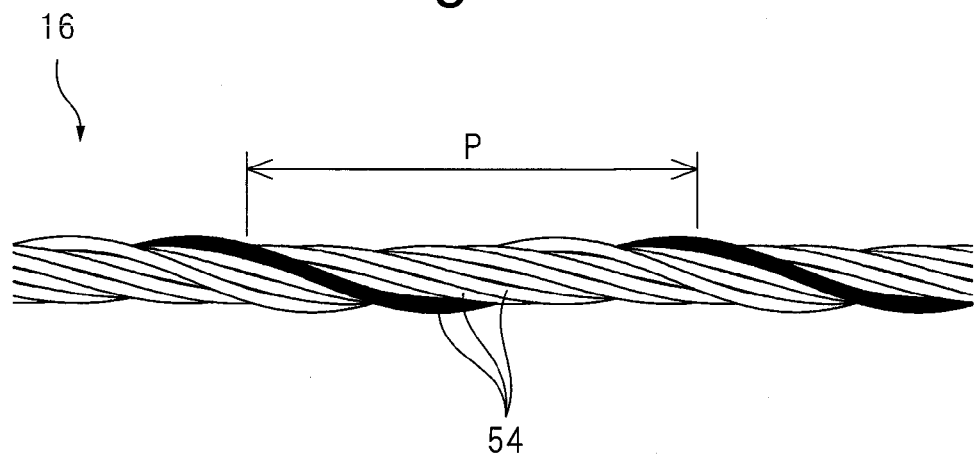
FIG. 6 is a view showing an example of a concrete constitution of the umbilical member.

In order that umbilical member 16 be rotated along with guide member 28 mainly due to the frictional force, it is preferable that umbilical member 16 has a certain degree of rigidity or elasticity. FIG. 6 shows an example of such an umbilical member. In the example of FIG. 6, a plurality of cables or tubes 54 are combined and integrally twisted so as to constitute substantially one umbilical member (or bundle), the rigidity of which is raised. In such a constitution of the umbilical member, the twisting direction or amount of the twisting per unit of length (or a pitch "P") of cables or tubes 54 may be determined so as to adjust the rigidity of umbilical member 16, whereby the umbilical member does not outwardly projects in a twisting radial direction of thereof depending on the configuration and/or the condition of the robot arm.

Figure 7:
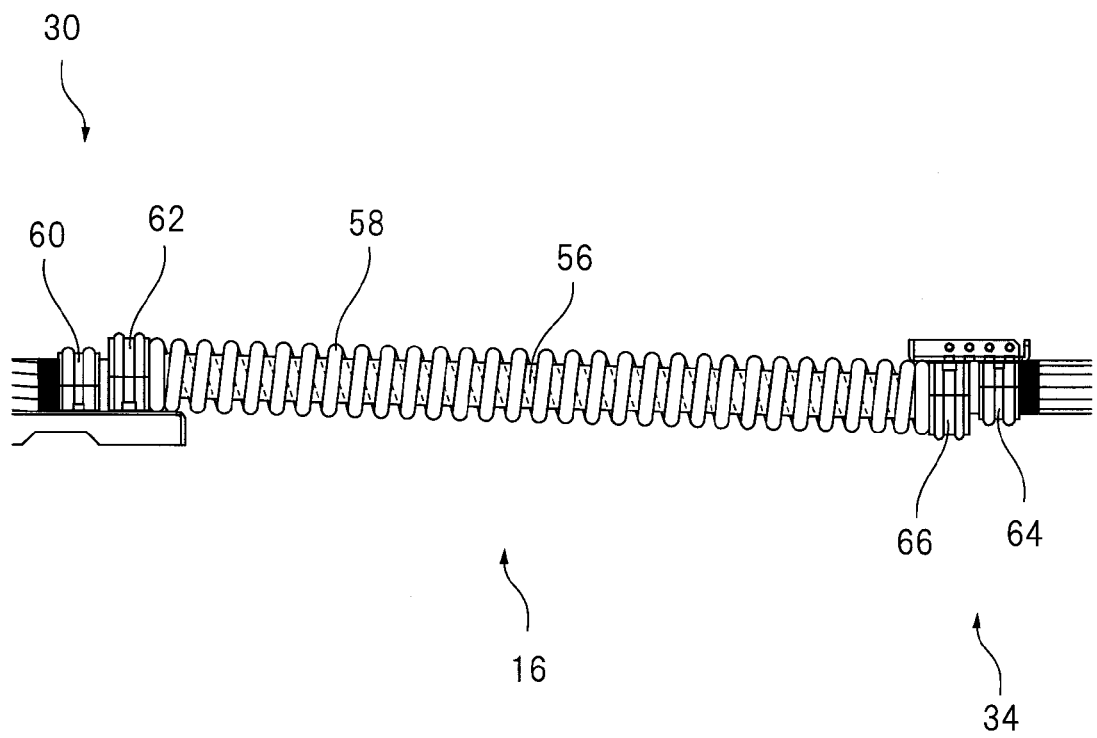
FIG. 7 is a view indicating an example wherein a cover and a coil spring are arranged for the umbilical member.

FIG. 7 shows an example wherein umbilical member 16 is protected by a cover and a spring. Umbilical member 16 is constituted by enclosing the bundle as shown in FIG. 6 with a cylindrical cover 56 made from a textile or a rubber sheet, and inserting cover 56 into a coil spring 58. In the umbilical member constituted as such, the cables or tubes may be effectively protected from external shock or frictional damage.

When the umbilical member as shown in FIG. 7 is used, it is preferable that first fixing member 30 clamps the cables/ tubes together with the cover, and clamps the coil spring separately from the cover. Concretely, first fixing member 30 has a cover clamping part 60 adapted to clamp cover 56 and a spring clamping part 62 adapted to clamp coil spring 58. Similarly, it is preferable that second fixing member 34 has a cover clamping part 64 adapted to clamp cover 56 and a spring clamping part 66 adapted to clamp coil spring 58.

Although umbilical member 16 is protected by both cover 56 and coil spring 58 in the example of FIG. 7, only one of cover 56 and coil spring 58 may be used to protect the umbilical member. When coil spring 58 is used, by properly determining a pitch of the spring and/or a diameter of a wire constituting the spring, umbilical member 16 may be provided with a desired rigidity or elasticity as well as protective function, even if the umbilical member is not constituted as shown in FIG. 6.

According to the present invention, the frictional force is generated between the umbilical member and the second plate member and between the umbilical member and the connecting member, and then the umbilical member is rotated along with the rotation of the second plate member and the connecting member. Therefore, the motion of the umbilical member may be controlled so that the umbilical member does not widely project outward in the rotational radial direction, whereby the arrangement unit for the umbilical member, wherein the umbilical member does not interfere with external equipment, may be realized. Further, the cross-sectional region of the connecting member in a direction perpendicular to the wrist axis includes the wrist axis, and extends from the wrist axis in the first radial direction by a distance equal to or larger than a half of a size of the umbilical member in the cross-sectional direction perpendicular to the longitudinal direction thereof, whereby the guide member may have high rigidity in spite of a simple configuration.

By combining and integrally twisting a plurality of cables or tubes so as to form the umbilical member in a bundle, the umbilical member may be somewhat rigid or elastic, whereby the umbilical member does not widely project from the arm section. The rigidity or elasticity of the umbilical member may be adjusted by changing the twisting direction or amount of the twisting of the plurality of cables or tubes per unit of length.

By providing the cover and/or the coil spring to the umbilical member, the umbilical member may be protected from external shock or the like. Further, when the coil spring is used, the umbilical member may be somewhat rigid or elastic.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. An arrangement unit for an umbilical member at a robot wrist section, the wrist section having a base end side and a front end side rotatable about a wrist axis relative to the base end side, the umbilical member extending to an end effector attached to the front end side of the wrist section via a forearm of an industrial robot, the umbilical member being constituted by at least one of a cable adapted to supply power or a signal to the end effector and a tube adapted to supply coolant or activation air to the end effector, the arrangement unit comprising a guide member comprising:
   a first plate member attached to the front end side of the wrist section;
   a second plate member, to which the end effector is fixed, the second plate member being opposed to the first plate member and separated from the first plate member by at least a distance corresponding to a size of the umbilical member in a cross-sectional direction perpendicular to a longitudinal direction thereof; and
   a connecting member which connects the first and second plate members to each other,
   wherein a cross-sectional region of the connecting member in a direction perpendicular to the wrist axis includes the wrist axis, extends from the wrist axis in a first radial direction by a distance larger than a half of a size of the umbilical member in the cross-sectional direction perpendicular to the longitudinal direction thereof, and extends from the wrist axis in a second radial direction by a distance smaller than a half of the size of the umbilical member in the cross-sectional direction perpendicular to the longitudinal direction thereof, the first and second radial directions being symmetrical with respect to the wrist axis,
   and wherein a holding member which holds or guides the umbilical member on the base end side of the wrist section and a fixing member which fixes the umbilical member on the side of the second plate member of the guide member are positioned opposed to each other in relation to the wrist axis when a rotational angular position of the guide member is positioned at the center of a motion range thereof so that the umbilical member contacts at least one of the second plate member and the connecting member at any rotational angular position in a predetermined rotational angular range of the guide member relative to the base end side of the wrist section.

2. The arrangement unit as set forth in claim 1, wherein the umbilical member is constituted by combining and integrally twisting a plurality of cables or tubes so as to form a bundle.

3. The arrangement unit as set forth in claim 2, wherein the twisting direction or an amount of the twisting of the plurality of cables or tubes per unit of length is determined so that the umbilical member does not outwardly project in a twisting radial direction of thereof.

4. The arrangement unit as set forth in claim 1, wherein the umbilical member has at least one of a cover adapted to enclose the umbilical member and a coil spring through which the umbilical member extends.

\* \* \* \* \*